United States Patent
Horsch

(10) Patent No.: US 10,952,368 B2
(45) Date of Patent: Mar. 23, 2021

(54) SOWING COULTER ARRANGEMENT OF AN AGRICULTURAL MACHINE

(71) Applicant: Horsch Maschinen GmbH, Schwandorf (DE)

(72) Inventor: Philipp Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 306 days.

(21) Appl. No.: 15/756,237

(22) PCT Filed: Aug. 25, 2016

(86) PCT No.: PCT/EP2016/070027
§ 371 (c)(1),
(2) Date: Feb. 28, 2018

(87) PCT Pub. No.: WO2017/036896
PCT Pub. Date: Mar. 9, 2017

(65) Prior Publication Data
US 2018/0249621 A1 Sep. 6, 2018

(30) Foreign Application Priority Data

Aug. 28, 2015 (DE) .......................... 102015114362.3

(51) Int. Cl.
*A01C 7/20* (2006.01)
*A01C 5/06* (2006.01)
(Continued)

(52) U.S. Cl.
CPC .............. *A01C 7/201* (2013.01); *A01B 15/18* (2013.01); *A01B 21/08* (2013.01); *A01B 49/06* (2013.01);
(Continued)

(58) Field of Classification Search
CPC ........... A01C 7/201; A01C 5/06; A01C 5/062; A01C 5/064; A01C 7/12; A01C 5/068; A01B 49/06
See application file for complete search history.

(56) References Cited

U.S. PATENT DOCUMENTS 3,598,069 A * 8/1971 Hatcher ................. A01B 49/04
111/190
4,307,674 A 12/1981 Jennings et al.
(Continued)

FOREIGN PATENT DOCUMENTS

CN 102754545 A 10/2012
CN 103619159 A 3/2014
(Continued)

*Primary Examiner* — Alicia Torres
(74) *Attorney, Agent, or Firm* — Erickson Kernell IP, LLC; Kent R. Erickson

(57) ABSTRACT

A sowing coulter arrangement comprises a suspension device for mounting the sowing coulter arrangement on a machine frame; a coulter frame connected to the suspension device for mounting components of the sowing coulter arrangement thereon; and a coulter disk. The arrangement further comprises a furrow closer pivotally mounted on the coulter frame; a metering device for dispensing the material to be distributed; a seed tube for transporting the material to be distributed from the metering device to a seed furrow; and a catching element for catching the material disposed downstream of the outlet of the seed tube. The metering device, the seed tube, and the catching element form a unit and are mounted on a carrier that is pivotably affixed to the coulter frame, whereby an arrangement of an outlet of a seed tube in relation to a catching element is at all times kept largely constant.

27 Claims, 8 Drawing Sheets

(51) Int. Cl.
*A01C 7/12* (2006.01)
*A01B 49/06* (2006.01)
*A01B 15/18* (2006.01)
*A01B 21/08* (2006.01)
*A01B 61/04* (2006.01)
*A01C 7/08* (2006.01)
*A01C 7/16* (2006.01)

(52) U.S. Cl.
CPC ............ *A01B 61/046* (2013.01); *A01C 5/062* (2013.01); *A01C 5/068* (2013.01); *A01C 7/081* (2013.01); *A01C 7/12* (2013.01); *A01C 7/127* (2013.01); *A01C 7/166* (2013.01); *A01C 7/203* (2013.01); *A01C 7/206* (2013.01); *A01C 5/064* (2013.01)

(56) References Cited

U.S. PATENT DOCUMENTS

| | | | |
|---|---|---|---|
| 5,425,318 A * | 6/1995 | Keeton | A01C 5/066 |
| | | | 111/197 |
| 6,032,593 A | 3/2000 | Wendling et al. | |
| 6,209,466 B1 | 4/2001 | Wodrich | |
| 6,308,645 B1 * | 10/2001 | Newkirk | A01C 7/04 |
| | | | 111/63 |
| 6,386,127 B1 | 5/2002 | Prairie et al. | |
| 6,651,570 B1 * | 11/2003 | Thiemke | A01C 7/18 |
| | | | 111/184 |
| 7,631,606 B2 | 12/2009 | Sauder et al. | |
| 8,671,856 B2 | 3/2014 | Garner et al. | |
| 8,850,997 B2 | 10/2014 | Silbernagel et al. | |
| 9,451,740 B2 * | 9/2016 | Kowalchuk | A01C 7/046 |
| 9,591,798 B2 | 3/2017 | Horsch | |
| 9,596,802 B2 | 3/2017 | Funck | |
| 2002/0174813 A1 | 11/2002 | Hagny | |

FOREIGN PATENT DOCUMENTS

| | | |
|---|---|---|
| DE | 2934121 C2 | 3/1981 |
| DE | 102007062967 A1 | 6/2009 |
| DE | 102012105048.1 A1 | 12/2013 |
| DE | 102012105081.3 A1 | 12/2013 |
| DE | 102015101253.7 A1 | 7/2016 |
| EP | 0404241 A1 | 12/1990 |
| EP | 0956755 A1 | 11/1999 |
| EP | 2018800 A1 | 1/2009 |
| EP | 2022307 B1 | 7/2012 |
| WO | 2011119095 A1 | 9/2011 |
| WO | 2015031840 A1 | 3/2015 |

* cited by examiner

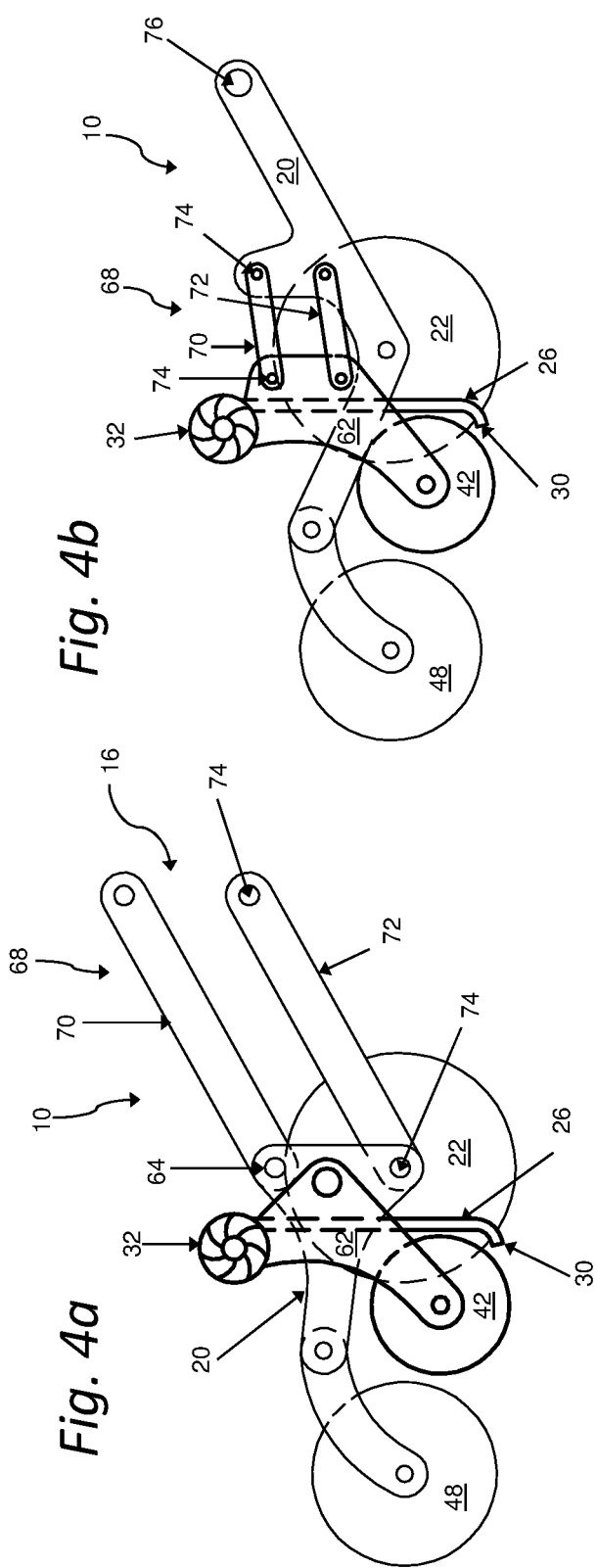

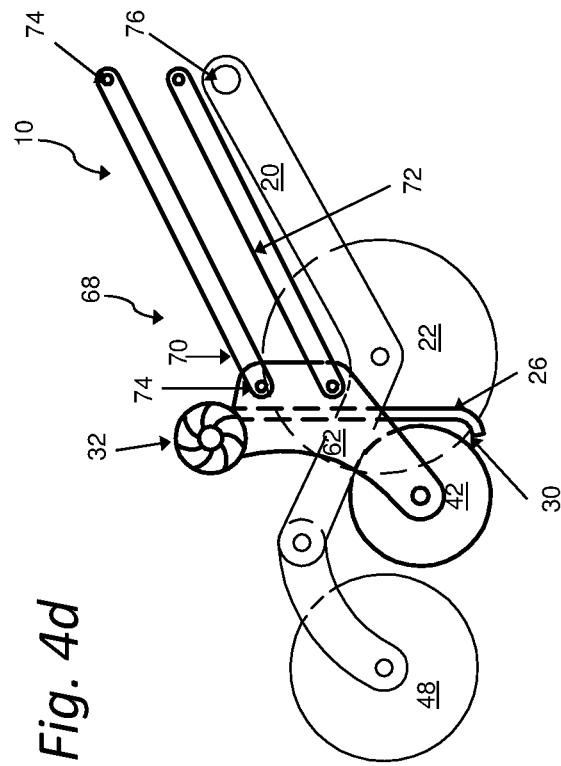
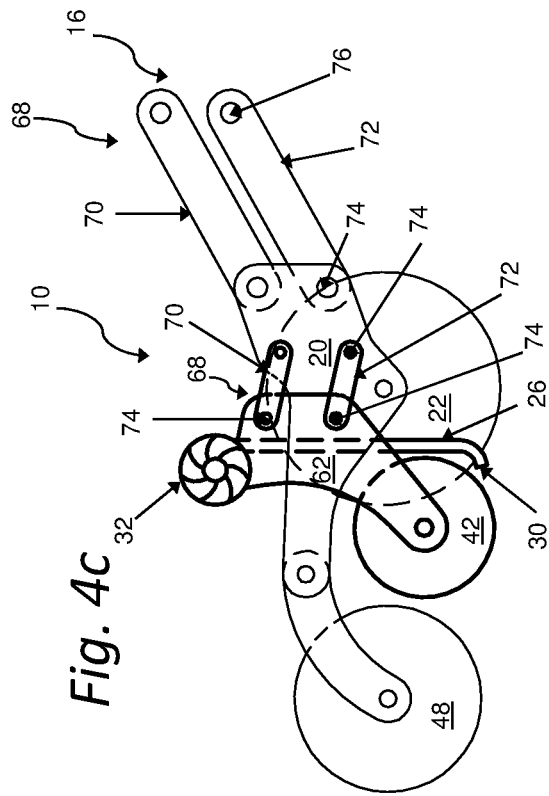

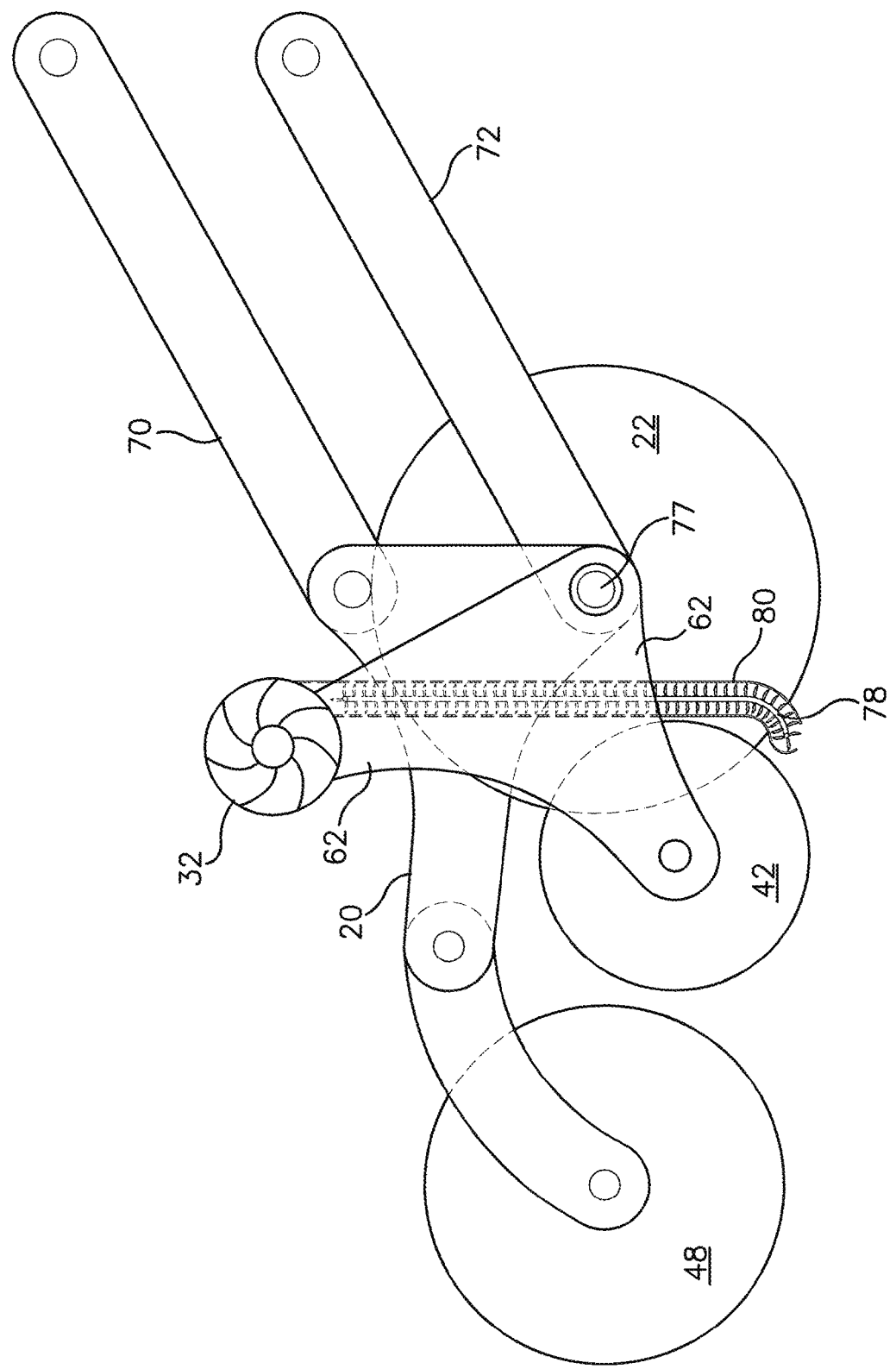

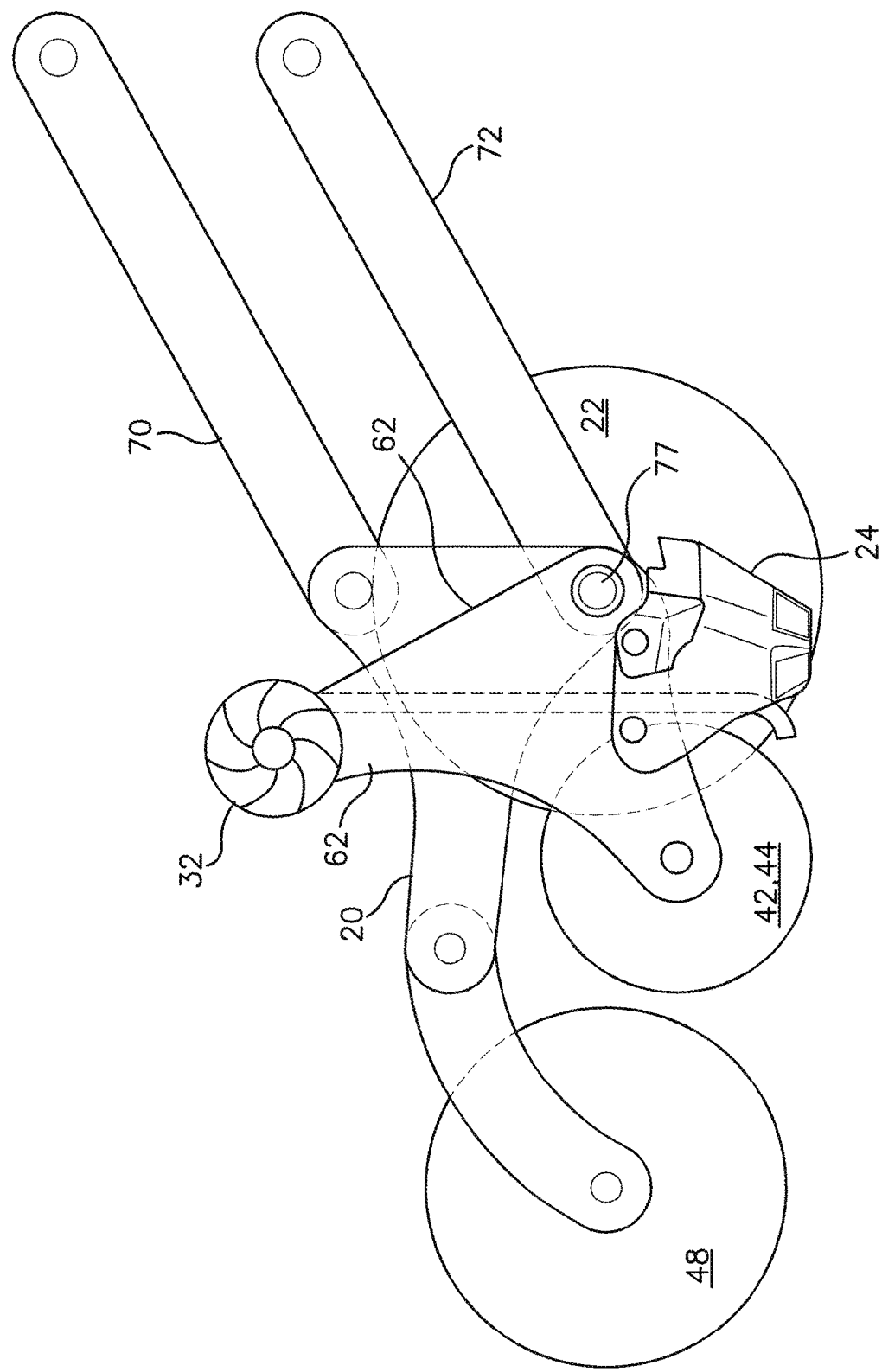

SOWING COULTER ARRANGEMENT OF AN AGRICULTURAL MACHINE

CROSS-REFERENCE TO RELATED APPLICATION

This application claims priority from German patent application No. 102015114362.3 filed Aug. 28, 2015, the disclosure of which is hereby incorporated herein in its entirety by reference.

FIELD OF THE INVENTION

The present invention relates to a sowing coulter arrangement of an agricultural machine for soil tillage and/or for spreading materials to be distributed, such as seeds, fertilizer, or the like.

BACKGROUND

Seed drill coulters or sowing coulters, such as double-disk coulters, single-disk coulters, or tine coulters, are known from the prior art in the most diverse of embodiment forms. Such a sowing coulter is disclosed in EP 2 022 307 B1, for example. The disclosed sowing coulter is used with an agricultural single-grain sowing machine. Arranged at a coulter frame, there is at least one coulter disk to serve as furrow-opening unit and therebehind is a seed tube with an associated catching roller and a subsequent pressure roller. In order to facilitate assembly and maintenance of the seed tube, it is provided that the seed tube, the catching roller, and the pressure roller are disposed as a unit on a coulter frame in a detachable and/or swing-away manner. In order to ensure that the material to be distributed is optimally dispensed from a seed tube into a seed furrow, the outlet of the seed tube is moreover disposed such that the seed flow is aligned tangentially to the circumference of the catching roller. The catching roller is followed by a pressure roller, by means of which the distributed material is pressed into the soil. The catching roller and the pressure roller are affixed together on one common pivotable carrier, resulting in the disadvantage that shocks and impacts or vibrations acting upon the sowing coulter and being caused by bumpy ground, for example, are in each instance transmitted from the catching roller onto the pressure roller and vice versa, thereby impairing the required even dispensing of the material to be distributed.

DE 2 934 121 C2 shows another sowing coulter. This coulter consists of a furrow opener with a following pressure roller. The furrow opener can be designed, for example, as a tine coulter or the like. The pressure roller moreover serves both for depth control and as a catching element. Following a metering device or a separating device, the material to be distributed is dispensed into a seed tube. The material to be distributed is subsequently pneumatically accelerated in the seed tube. The outlet of the seed tube is disposed in such a manner that the seed flow forms an angle bisector between a ground surface and a tangent to the pressure roller. In this way, it is intended that the material to be distributed, which has been accelerated by the seed tube, is slowed down and that the distributed material is prevented from undesired bouncing or undesired rolling in the seed furrow. However, the pressure roller can move independently of the seed tube outlet, thus partly impairing the desired arrangement and the described effect.

WO 2011 119 095 A1 shows a further seed drill coulter for a single-grain sowing machine. This seed drill coulter or sowing coulter has a pneumatically operated seed tube arranged on the side of at least one coulter disk. The outlet of the seed tube, or, as the case may be, the seed flow at the outlet of the seed tube, is directed such that it forms a tangent to a circumference of a catching element, preferably of a catching roller. The catching roller and a pressure roller following it are affixed together on one common coulter frame, with the pressure roller in turn being mounted to be pivotable in relation to the coulter frame. The catching roller and the pressure roller are thus decoupled from one another. The seed tube or, as the case may be, the metering device, is likewise decoupled from the catching roller, which in turn leads to the tangential arrangement not being permanently ensured, and thus to a negative influence on the dispensing of the material to be distributed. The dispensing quality can be moreover improved or impaired depending on the nature of the ground or, more precisely, on impacts and vibrations, which lead to the distribution precision not being steadily and evenly ensured.

Therefore, although numerous diverse sowing coulters are known from the prior art that in each instance have a seed tube, a catching element, and a pressure roller, they nevertheless do not permanently ensure a defined arrangement of a seed tube in relation to a catching roller, and thus it is not possible to achieve a consistent distribution precision.

SUMMARY OF THE INVENTION

The sowing coulters with a metering device for single-grain metering as have become known from the prior art are usually affixed to an agricultural machine via a so-called parallelogram linkage. The advantage thereof is that the sowing coulter can move parallel to a ground surface at all times, independently of its working depth. Moreover, such sowing coulters are generally designed as so-called double-disk coulters, that is to say that in each case two cutting disks disposed at an angle in relation to one another create one seed furrow. Such parallelogram linkages, however, require an elaborate and costly input of parts. In addition, each of the parallelogram linkages has very many pivot points, resulting in very high-maintenance sowing coulters. Furthermore, such double-disk coulters are only suitable to a limited extent for direct drilling in particular, since great forces are required for the two cutting disks to penetrate into the soil.

So-called single-disk coulters present an alternative to such double-disk coulters with parallelogram linkage. EP 0 956 755 A1, for example, describes a single-disk coulter. Single-disk coulters are generally affixed to an agricultural machine via a central pivot point. Also, the seed furrow is created by only one cutting disk that is disposed at an angle to the driving direction. Suchlike sowing coulters are, in particular, used for direct drilling, that is, for placing the seeds into unprepared soil. It is not yet possible, however, to mount a metering device for single-grain metering on such sowing coulters with a central pivot point. This is due to the fact that even a slight depth adjustment of these sowing coulters has a great impact on the position between seed tube and seed furrow and accordingly on the position between seed tube and catching roller. Particularly the angle positions are greatly influenced in this context so that precise seed placement cannot be ensured with different sowing depths.

The underlying task of the invention is therefore seen in creating a sowing coulter or, as the case may be, a sowing coulter arrangement, of an agricultural machine with an improved arrangement of a metering device, a seed tube, and a catching element relative to each other as well as in relation to a pressure roller or to a furrow-closing element, whereby an arrangement of a seed tube outlet relative to a catching element is at all times kept largely constant. The improved arrangement according to the invention is intended for ensuring that the material to be distributed is steadily and evenly dispensed from a seed tube into a seed furrow.

The present invention thus proposes a sowing coulter arrangement, for example with a single-disk coulter or a double-disk coulter, for soil tillage and/or for spreading materials to be distributed, such as seeds, fertilizer, or the like. The sowing coulter arrangement has at least a suspension device for mounting the sowing coulter arrangement on a frame structure. The sowing coulter arrangement according to the invention further comprises a coulter frame, on which the components of the sowing coulter or, as the case may be, the components of the arrangement, can be mounted. For the purpose of creating a seed furrow, at least a rotatably disposed coulter disk or a tine implement is mounted on the coulter frame. The particular material to be distributed is placed in the seed furrow. Furthermore, a rotatably disposed depth control roller can be mounted on the coulter frame, by means of which depth control roller the depth adjustment of the coulter disk and accordingly of the seed furrow is carried out. A pressure roller for pressing the distributed material into the soil and for closing the seed furrow can be pivot-mounted and/or tandem-mounted on the coulter frame and arranged so as to follow the coulter disk that is at least present, or, as the case may be, the tine implement. For the purpose of closing the seed furrow, it is also conceivable that, for example, a harrow or the like broaching tool is or, as the case may be, are affixed to the coulter frame to serve as furrow-closing element/s.

The sowing coulter arrangement according to the invention further comprises a metering device for the at least to a large extent separated or, as the case may be, evenly dispersed dispensing of the material to be distributed, as well as a seed tube arranged downstream of or associated with said metering device. The seed tube can be disposed laterally from a coulter disk or, as the case may be, centrally between two coulter disks, or behind the tine implement. The seed tube outlet preferably ends in an area immediately above a ground surface or, as the case may be, above the seed furrow. A catching element is preferably arranged downstream of the seed tube outlet. Said catching element is preferably located next to at least one coulter disk or, as the case may be, between the two coulter disks, or behind the tine implement and in front of the pressure roller or, as the case may be, in front of the furrow-closing element. The seed tube outlet is directed such that a seed flow is generated that can form, for example, a tangent to a circumference of the catching element or, as the case may be, of the catching roller. In this manner, the catching element is intended to slow down the distributed material in the seed furrow and to protect it against undesired rolling and undesired bouncing, thereby achieving an improved dispensing of the distributed material in the seed furrow. In order to ensure at all times that this is carried out independently of movements of the catching element and/or of the pressure roller, as well as independently of the working depth, at least the metering device, the seed tube, and the catching roller form a unit and are mounted together on one common carrier, with the carrier being preferably pivot-mounted or, as the case may be, pivotably connected to a coulter frame or to a frame structure of an agricultural machine via an axle or by means of a parallelogram linkage. The carrier can thus move independently of the pressure roller. On the one hand, for example, a tangential arrangement between seed flow and catching element is at all times ensured in this way, and on the other hand, it is ensured that movements of the catching element are not transmitted to the coulter frame or to the pressure roller and vice versa. Shocks, vibrations, or the like thus no longer have an influence on the dispensing of material to be distributed.

The mentioned unit formed by at least the metering device, the seed tube, and the catching roller, can, in particular, refer to an assembly or to a unit that is structurally integrated and/or to a unit the elements of which form an operative connection between each other, with the unit being mounted on the common carrier.

Particularly with sowing coulters that are connected to an agricultural machine via a central pivot point, it is thus possible to achieve a permanently constant distribution precision, since changes of the angle position of the sowing coulter no longer have an influence on the position between seed tube and catching element. This can be further improved, in particular, if the carrier of the metering device, the seed tube, and the catching element is connected to the coulter frame or to the agricultural machine via a parallelogram linkage.

Besides the metering device, the seed tube, and the catching roller, it is moreover conceivable in a further embodiment that the furrow opener, which is likewise present on a sowing coulter, in particular on a single-disk coulter, also forms a part of said unit and is also mounted to the carrier or, as the case may be, to the seed tube.

In addition to a seed flow alignment that is tangential to the circumference of the catching element, it is also conceivable that the seed flow forms an angle bisector or a line disposed between the ground surface and a tangent to the circumference of the catching element. In this instance, the tangent to the circumference of the catching element encloses an angle in relation to the ground surface, with said angle being less than 75°, in particular less than 60°, and preferably less than 45°. This in turn results in slowing down the material to be distributed and in preventing undesired bouncing or undesired rolling.

The arrangement of the seed flow is preferably aligned such that the seed flow is cut off or, as the case may be, interrupted by means of the catching element, whereby the material to be distributed is slowed down and undesired rolling and undesired bouncing of the distributed material in the seed furrow is prevented.

Connecting the carrier to, for example, the coulter frame or the frame structure of an agricultural machine by means of a parallelogram linkage or a four-joint arrangement moreover has the advantage that an angle between seed flow and ground surface is at all times largely constant, independently of the working depth. It is likewise conceivable that the suspension device of the sowing coulter forms a parallelogram linkage. It is further conceivable that both the suspension device and the connection between coulter frame and carrier form a parallelogram linkage. Generally, the most diverse of suspension devices and connections are thus conceivable, with these being in each case designed such that a relative arrangement between a seed tube outlet and a catching element can be at all times kept constant independently of movements of the sowing coulter.

In a further embodiment variant, it is conceivable that the coulter disk and the carrier are pivot-mounted together on one common pivot point or, as the case may be, on one common axle.

The carrier can be preloaded by way of a spring element in relation to the ground surface or, as the case may be, in relation to the seed furrow. For example, a pressure spring, a hydraulic or pneumatic actuator, or the like can be used as a spring element. Other spring elements are also conceivable. The preload is intended for guiding the unit of seed tube and catching element in a constant manner in the seed furrow. Preferably, however, the preload is selected such that a movement of the carrier is still possible, for instance when driving over stones. Said preload or, as the case may be, said spring option additionally has the advantage that the catching element can be made from, for example, a hard material, such as a metallic material or a synthetic material or a composite material, which materials are substantially more durable and cheaper than elastic materials. Elastic materials are, however, also conceivable, for example elastic synthetic materials or composite materials or rubber materials, with the effect that preloading the carrier could be omitted when using such materials. Designing the catching element from elastic material would moreover have the advantage that a further cushioning against shocks and impacts would be carried out by means of the elastic catching element, thereby in turn preventing a negative influence on the entire dispensing process of the material to be distributed. It is also conceivable to preload only the catching element toward the seed furrow by means of a spring.

A metering device is associated with the sowing coulter. This metering device makes it possible to separate, at least to a large extent, the particular material to be distributed, for which separation it is possible to use different separating methods that are known from the prior art. The metering device can operate based on the principle of differential pressure and/or on the principle of centrifugation, for example. Preferably, the metering device can operate based on the principle of positive pressure, and it can have, in particular, the features as described in the German patent application 10 2015 101 253.7. The metering device could equally operate based on the principle of centrifugation and have the features as described in the German patent application 10 2012 105 081.3 or in the German patent application 10 2012 105 048.1. Mechanical metering devices are conceivable as well.

The material to be distributed can undergo an active acceleration in the metering device and/or in the seed tube. This can be carried out, for example, by means of a separating disk rotating inside the metering device, or by means of a differential pressure prevailing between the housing of the metering device and the seed tube outlet. Pneumatic nozzles, for example a ring nozzle or the like, can be applied, too. The material to be distributed is conveyed through the seed tube by the acceleration at a speed that is preferably greater than the acceleration of gravity. The intention behind this acceleration is that shocks and vibrations do not influence the transport of the material to be distributed that is located in the seed tube.

It is also conceivable that the seed tube includes a conveyor belt, that is to say that the material to be distributed is not conveyed through the seed tube by means of gravity or airflow, but that a conveyor belt receives the material to be distributed from the metering device and transports it downward to the seed furrow.

The coulter frame can be designed either in one piece or in multiple pieces. The coulter frame could thus have a coulter tube, for example, to which various different mounting plates or mounting elements or the like can be affixed. In addition, the coulter tube could be manufactured by casting or forging. Bearing elements or parts of the suspension device could also be integrated into the coulter tube or, as the case may be, into the coulter frame.

Said suspension device can likewise be designed in various different ways, while said suspension device in each case serves to connect the coulter frame or, as the case may be, the sowing coulter, to a frame structure of an agricultural machine. The suspension device could thus be pivotably connected to the frame structure by way of a swivel axle or, as the case may be, by way of a central pivot point. For this purpose, the swivel axle could also be equipped, for example, with a rubber cord bearing as known from the prior art. The suspension device could have a parallelogram linkage, too. A rigid or fixed connection between sowing coulter and frame structure is conceivable, while pivotable or movable connections are, however, preferably used.

The pressure roller and/or the catching element and/or the depth control roller could furthermore each be realized with the same roller, with the result that not three rolls or elements would be required, but only one roll or element, thus substantially reducing the input of parts. That is to say that when the components of the sowing coulter arrangement according to the invention are listed and several functional elements are referred to, these are not necessarily to be understood to imply separate components. In fact, it is possible to combine several functions and to have them fulfilled by one or two components.

The depth control roller can moreover be mounted on the sowing coulter in many different positions. For example, it can be mounted, at least in sections, next to the coulter disk or, as the case may be, next to the tine coulter and/or, at least in sections, next to the catching element. It can equally be mounted behind the coulter disk or, as the case may be, behind the tine coulter, and behind the catching element, in which embodiment the depth control roller can also form the pressure roller.

The present invention is particularly suitable for use in so-called single-disk coulters. These sowing coulters are usually used for direct drilling, that is to say that they are used for spreading the material to be distributed in unprepared soil. For achieving an adequate distribution precision, however, this type of sowing makes high demands on the sowing coulters, since the unprepared ground can lead to particularly pronounced vibration effects. Only by arranging the seed tube and the catching element according to the invention together on one common carrier does it thus become realizable to use a metering device in a single-disk coulter and achieve a consistent distribution quality at the same time.

Mostly, the "sowing coulter arrangement" according to the invention is referred to in the context of the present description of the invention. In some places, the arrangement according to the invention is referred to as "seed drill coulter" or as "sowing coulter" for short. These terms are generally intended as synonyms and they can be optionally substituted for each other.

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

BRIEF DESCRIPTION OF THE DRAWINGS

FIG. 5 shows a further embodiment variant of the sowing coulter in which with the carrier and a coulter disk are mounted on a common axle and including a conveyor belt for directing seeds from the metering device to a furrow.

FIG. 6 shows a further embodiment variant of the sowing coulter in which the metering device, seed tube, catching element and a furrow opener form a unit affixed to a carrier.

DETAILED DESCRIPTION OF THE INVENTION

Figure 1:
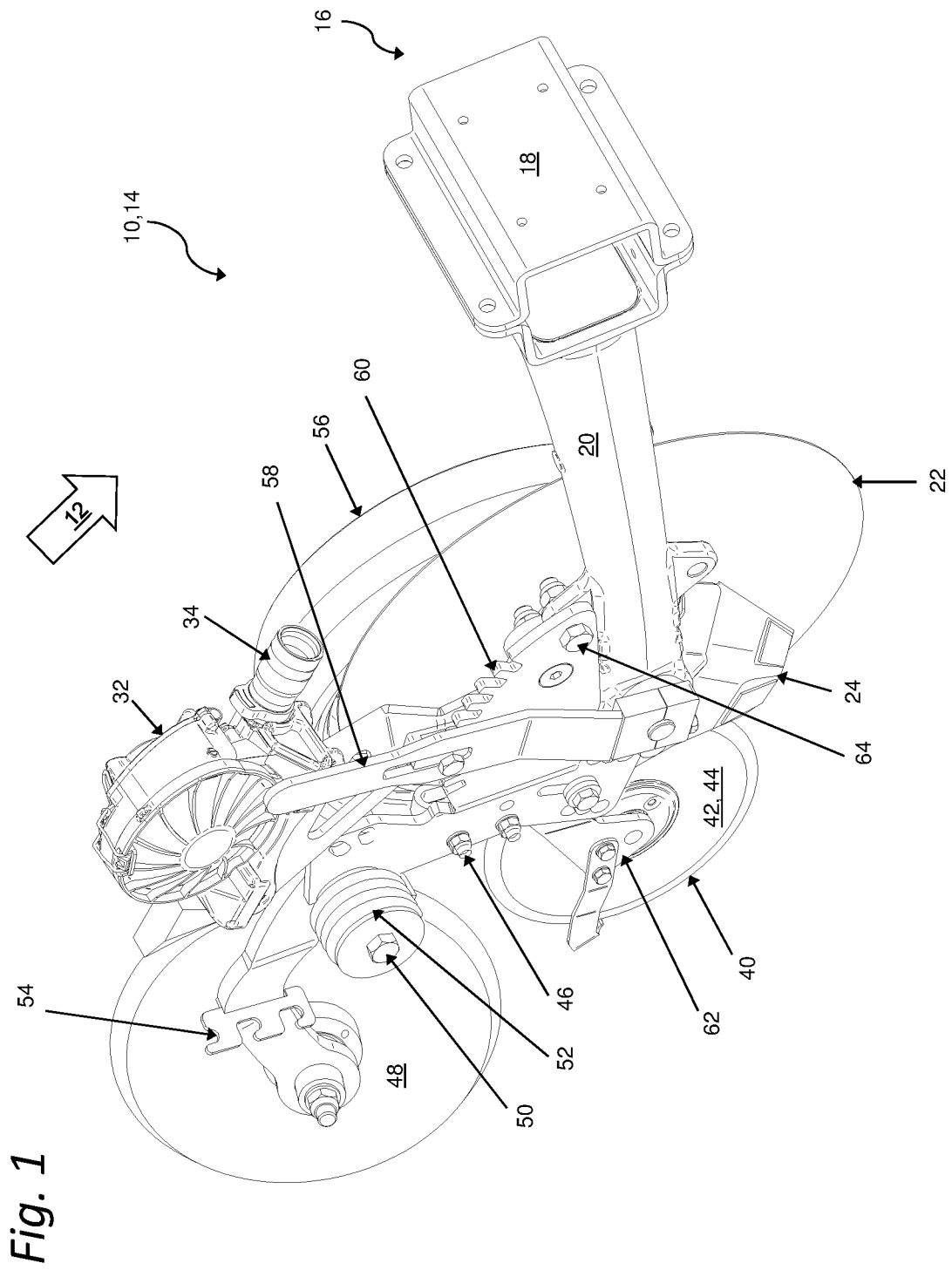
FIG. 1 shows a schematic perspective view of an embodiment variant of a sowing coulter of an agricultural machine.

The same or equivalent elements of the invention are each designated by the same reference characters in the FIGS. 1 to 4e. Furthermore, and for the sake of clarity, only the reference characters relevant for describing the individual figures are provided. It should be understood that the detailed description and specific examples of the sowing coulter according to the invention, while indicating preferred embodiments, are intended for purposes of illustration only and are not intended to limit the scope of the invention.

Figure 2:
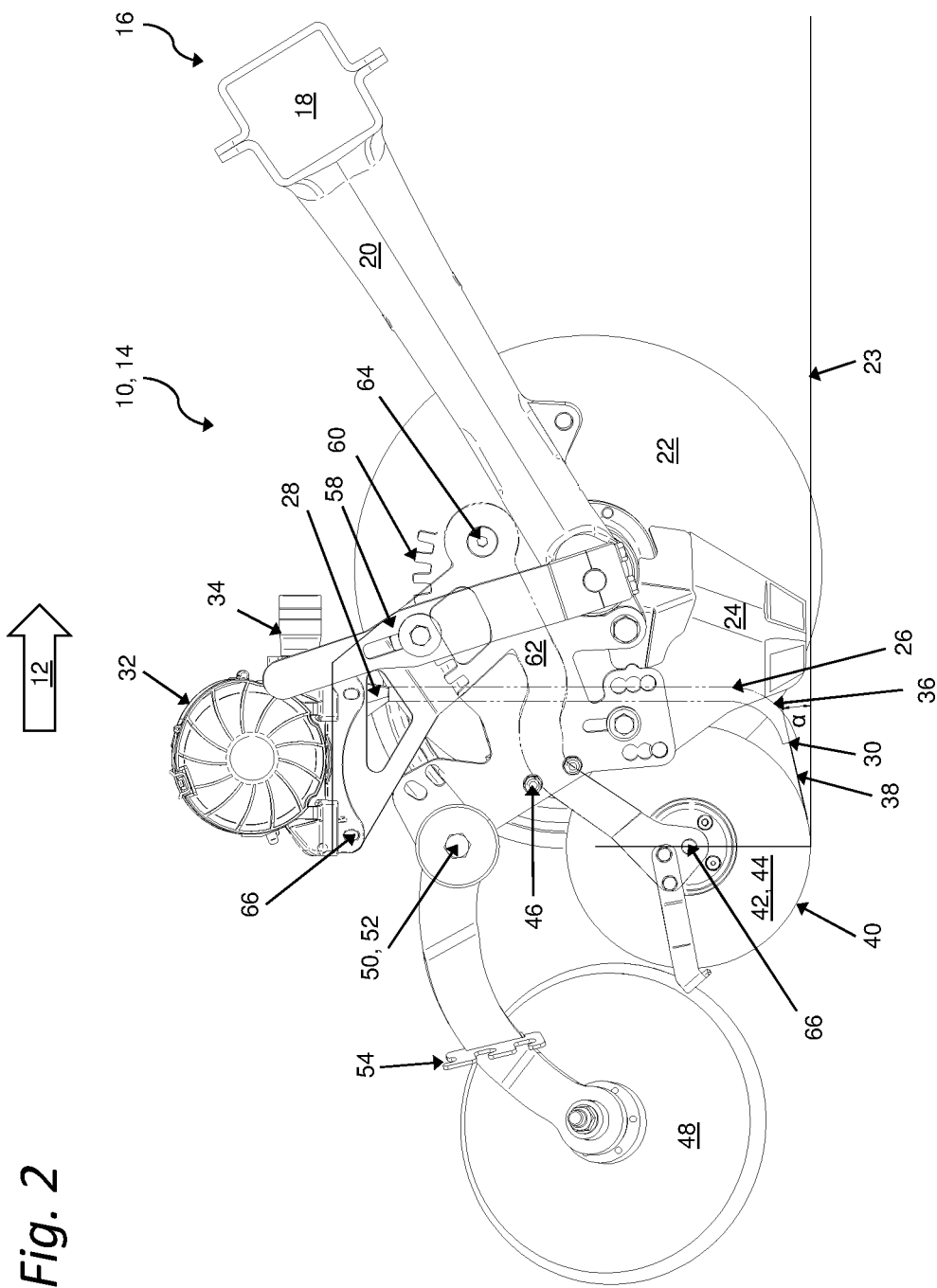
FIG. 2 shows an embodiment variant of a sowing coulter in a side view, with metering device, seed tube, catching element, and pressure roller.

FIG. 1 shows an embodiment variant of a sowing coulter arrangement 10 according to the invention in a schematic perspective view, which sowing coulter arrangement 10 can be used, for example, with an agricultural machine for spreading agricultural materials to be distributed, such as seeds, fertilizer, or the like. FIG. 2 shows the identical embodiment of the sowing coulter arrangement 10 according to FIG. 1 in a side view. In each case, the sowing coulter arrangement 10 is represented opposite to the driving direction 12. Such sowing coulter arrangements 10 can be mounted, for example, at regular spacings to each other on the frame structure of an agricultural machine. The exemplary embodiment of the sowing coulter arrangement 10 according to FIGS. 1 and 2 is a so-called single-disk coulter 14. The arrangement according to the invention could, however, likewise be used for a double-disk coulter or a tine coulter or the like, with single-disk coulters, however, being preferentially used.

The sowing coulter arrangement 10 is pivotably connected to a frame structure, which is not illustrated here, by way of a suspension device 16 or, as the case may be, by way of a rubber cord bearing as known from the prior art that is guided via a central axis of rotation. Other suspension devices 16 are, however, equally conceivable, such as flange sheets or weld-on plates or a parallelogram linkage (cf. FIG. 4) or the like. By means of the suspension device 16, it is possible to radially swivel the entire sowing coulter arrangement 10 about the frame structure and to thus move the sowing coulter arrangement 10, for example between a lowered position for driving in a field and a raised position for driving on the road. Furthermore, a coulter frame 20 is affixed to a bearing housing 18 of the suspension device 16 by means of welding, with other types of mounting being conceivable here as well. The appropriate coulter implements are mounted on the coulter frame 20. The coulter frame 20 is disposed asymmetrical to the bearing housing 18, but a symmetrical arrangement is also possible. The coulter frame is designed in multiple pieces and consists of a coulter tube and mounting plates affixed thereto. A one-piece design is equally conceivable.

A pivot-mounted coulter disk or cutting disk 22 is affixed to the coulter frame 20. Said coulter disk or cutting disk 22 is used to form a seed furrow in a ground surface 23, where the material to be distributed is subsequently placed. In order to ensure that the seed furrow is sufficiently large, the coulter disk 22 is preferably disposed at an angle transverse to the driving direction, with this angle being, for example, between approximately 4° and 8°. In the exemplary embodiment, however, this angle is approximately 6°. Additionally, associated with the coulter disk 22 is a furrow opener 24 or, as the case may be, a so-called sowing skid 24, on the one hand for preventing soil from adhering to the coulter disk 22, and on the other hand for keeping the seed furrow open until seed placement.

It is, however, also conceivable that in each case two oppositely positioned coulter disks 22 are disposed on the coulter frame 20, thus forming a double-disk coulter. By means of said coulter disks 22 disposed at an angle in relation to each other, it is likewise possible to create a sufficiently large seed furrow. The wedge formed by the two coulter disks 22 is, for example, at least 4°, preferably however, at least 8° or more.

A seed tube 26 is disposed laterally next to the at least one coulter disk 22 or, as the case may be, behind the furrow opener 24 or between the two coulter disks 22. The inlet 28 of said seed tube 26 leads into a metering device 32, which is also located at the sowing coulter arrangement 10. The material to be distributed is at least to a large extent separated or, as the case may be, evenly dispersed by means of the metering device 32, for which purpose various principles of separation as known from the prior art can be applied. It is possible to use such metering devices as operate, for example, based on the principle of differential pressure or such as operate based on the principle of centrifugation. The metering device 32 according to the exemplary embodiments of FIGS. 1 to 4 is a metering device 32 that operates based on the principle of centrifugation. For this purpose, a seed-air mixture is fed to the metering device 32 via a spout 34. Located within the metering device 32 is a rotating separating disk, which has at least one pocket or opening at its outer circumference for the purpose of receiving grains of the material to be distributed. Grains are received from the pocket, they are separated, and they are conveyed to a dispensing area by a rotation of the separating disk acting in connection with a housing wall. The top end of the seed tube 26 ends in said dispensing area. By way of the rotation of the separating disk and by an airstream present in the housing, the separated material to be distributed undergoes an active acceleration, whereby the grains are transported through the seed tube 26 at a speed that is greater than the acceleration of gravity. It would also be possible, however, that the acceleration of the material to be distributed is carried out in a purely pneumatic manner. The material to be distributed could also be transported through the seed tube 26 without being accelerated.

In the exemplary embodiments of FIGS. 1 to 4, the seed tube 26 is in each case disposed perpendicular to the driving direction 12, and it bends into a curved form 36 toward the outlet 30 of the seed tube 26. Also conceivable, however, is a seed tube 26 that has varying radiuses and shapes along its length. In particular, crescent-shaped or the like seed tube shapes are also conceivable.

Furthermore, the seed tube 26 is in each case mounted behind a furrow opener 24. It is, however, also conceivable that the seed tube 26 ends in the furrow opener 24 or, as the case may be, that it is guided through the furrow opener 24. It is likewise conceivable for the seed tube 26 to end in the furrow opener 24 and the furrow opener 24 to thus form the continuation of the seed tube 26. In particular, it is thus conceivable that the seed tube 26 is disposed between the at least one coulter disk 22 and the furrow opener 24. It is moreover conceivable that the furrow opener 24 is likewise disposed on the carrier 62 as shown in FIG. 6. It would thus be conceivable for a unit composed of the metering device 32, the seed tube 26, the catching element 42, and the furrow opener 2, to be mounted to the sowing coulter arrangement 10.

The outlet 30 of the seed tube 26 is inclined opposite to the driving direction 14. This results in a seed flow 38 that is, for example, at least largely tangential to an outer contour or, as the case may be, to a circumference 40, of a catching element 42 downstream of the outlet 30 of the seed tube 26. After being dispensed from the seed tube 26, the grains are slowed down or, as the case may be, caught, by means of the catching element 42, which is designed as catching roller 44 in the exemplary embodiment. In this way, the distributed material is largely prevented from undesired rolling and undesired bouncing in the seed furrow. The catching element 42 can be depth-adjusted in relation to the coulter disk 22 or, as the case may be, in relation to the carrier 62, by way of a connecting plate 46, for example. The catching element 42 is followed by a pressure roller 48 that is movably mounted via a pivot point 50 and that is preloaded by means of a spring 52. Via a latch 54, the preload force of said spring 52 can be readjusted as well. The distributed material is pressed into the soil by means of the pressure roller 48, and the previously cut seed furrow is closed such that the distributed material is covered with soil.

The depth adjustment of the sowing coulter arrangement 10 is carried out by means of a depth control roller 56, which is mounted on the coulter frame 20 in a rotatable manner as well, and which is located on the opposite side of the coulter disk 22 or, as the case may be, of the furrow opener 24. For the purpose of depth adjustment, the height or, as the case may be, the position of the depth control roller 56 can be readjusted in relation to the coulter disk 22 or, as the case may be, in relation to the furrow opener 24, by means of an adjustment lever 58 and gear teeth 60, whereby in turn the depth of the seed furrow can be correspondingly readjusted. The depth control roller 56 is moreover disposed in relation to the coulter disk 22 such that, in addition to serving for depth control, the depth control roller 56 also serves as a wiper for one side of the coulter disk 22.

Figure 3:
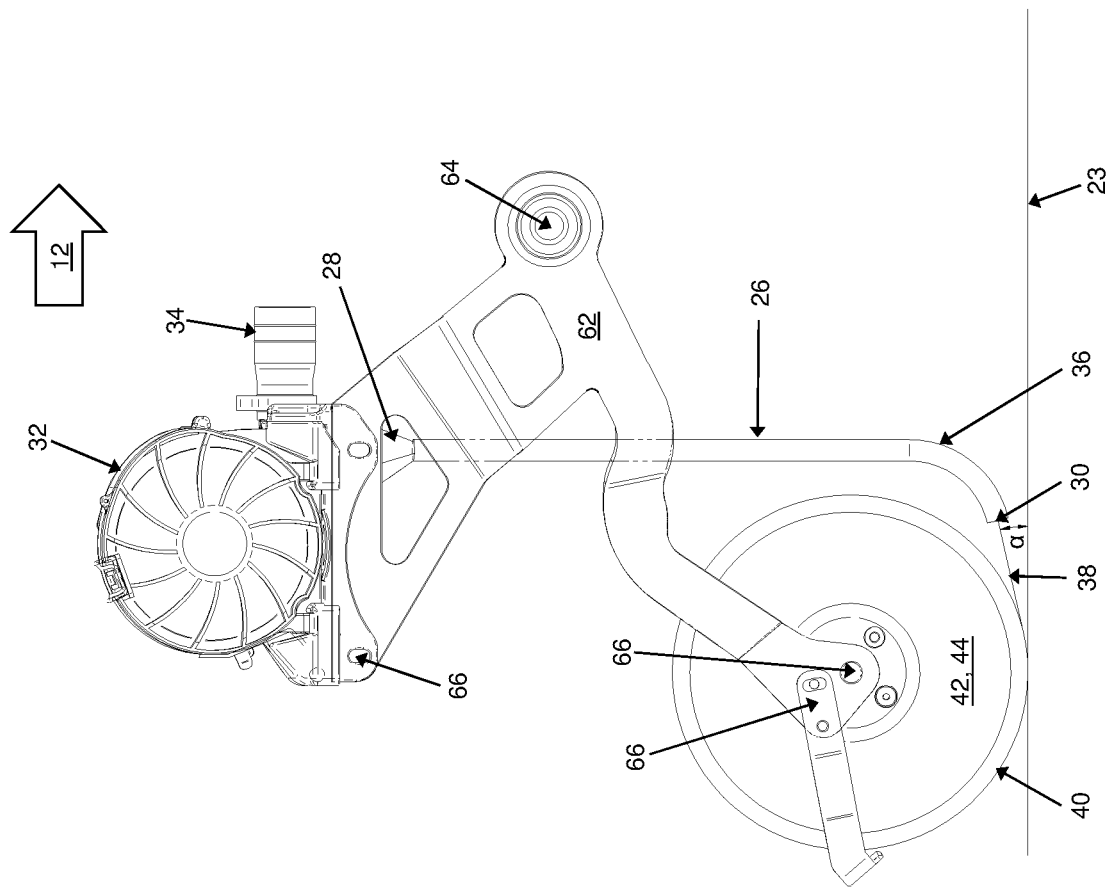
FIG. 3 shows a detailed view of an embodiment variant of the unit including a metering device, seed tube, and catching element on a carrier.

As is clear from the FIGS. 1 and 2 and, in particular, from FIG. 3, the metering device 32, the seed tube 26, and the catching element 42 are mounted as a unit on a carrier 62. Said carrier 62 is mounted on the coulter frame 20 in a rotatable manner via an axle 64. Preferably, said carrier 62 is preloaded in relation to a ground surface 23, for example by means of a spring or by means of a hydraulic cylinder or a pneumatic cylinder or the like. An arrangement between seed flow 38 or, as the case may be, an outlet 30 of the seed tube 26, in relation to a circumference 40 of the catching element 42 is at all times kept at least largely constant, independently of the sowing depth or, as the case may be, independently of the working depth, by means of the unit of seed tube 26 and catching element 42. This arrangement is a tangential arrangement in the FIGS. 2 and 3. Other arrangements are, however, also conceivable.

If the seed tube 26 is part of the furrow opener 24, for example, then said furrow opener 24 can also be mounted together with the seed tube 26, the catching element 42, and the metering device 32 on the carrier 62.

In the exemplary embodiment, the carrier 62 is formed as a metal sheet, and mounting elements 66 for attaching the catching element 42 and the metering device 32 are associated with it.

The carrier 62 in the exemplary embodiments of FIGS. 1 to 3 is in each case connected to the coulter frame 20 in a rotatable manner via an axle 64. Depending on the particular working depth, such an arrangement results in different angles α between a seed flow 38 and a ground surface 23. It is also conceivable, however, that the carrier 62 is connected to the coulter frame 20 via a parallelogram linkage 68 or four-joint arrangement, with the result that an angle between a seed flow 38 and a ground surface 23 is at all times largely constant, independently of the working depth. This can be further improved by connecting both the carrier 62 and the suspension device 16 in each case by means of a parallelogram linkage 68 to the coulter frame 20 or, as the case may be, to the frame structure. Sowing coulter arrangements 10 with such parallelogram linkages 68 are illustrated in the FIGS. 4a to 4e.

FIG. 4a in this context shows a sowing coulter arrangement 10 with the suspension device 16 designed as parallelogram linkage 68. The parallelogram linkage 68 consists of an upper link 70 and a lower link 72, which are each connected to a coulter frame 20 and to a frame structure, which is not illustrated here, by means of coupling points 74. A coulter disk 22 and a pressure roller 48 are mounted on the coulter frame 20, as well as a carrier 62 that is pivotable via an axle 64, with in turn a metering device 32, a seed tube 26, and a catching element 42 being disposed on the carrier 62 such that they form a unit, whereby the arrangement of an outlet 30 of the seed tube 26 in relation to the catching element 42 is at all times kept largely constant.

Furthermore, FIG. 4b shows a sowing coulter arrangement 10 that is mounted in a pivotable manner via a swivel axle 76 and by means of a coulter frame 20 on a frame structure, which is not illustrated here. A coulter disk 22 and a pressure roller 48 are mounted on the coulter frame 20, as well as a carrier 62 that is pivotable via a parallelogram linkage 68, with in turn a metering device 32, a seed tube 26, and a catching element 42 being disposed on the carrier 62 such that they form a unit, whereby the arrangement of an outlet 30 of the seed tube 26 in relation to the catching element 42 is at all times kept largely constant. The parallelogram linkage 68 consists of an upper link 70 and a lower link 72, which each establishes a pivotable connection between the carrier 62 and the coulter frame 20 via coupling points 74.

Beyond that, FIG. 4c shows a combination of embodiment variants of the sowing coulter arrangement 10 according to the FIGS. 4a and 4b. In this instance, the suspension device 16 of the sowing coulter arrangement 10 is designed as a parallelogram linkage 68, and it consists of an upper link 70 and a lower link 72, which are each connected to a coulter frame 20 and to a frame structure, which is not illustrated here, by means of coupling points 74. A coulter disk 22 and a pressure roller 48 are mounted on the coulter frame 20, as well as a carrier 62 that is pivotable via a further parallelogram linkage 68, with in turn a metering device 32, a seed tube 26, and a catching element 42 being disposed on the carrier 62 such that they form a unit, whereby the arrangement of an outlet 30 of the seed tube 26 in relation to the catching element 42 is at all times kept largely constant. The parallelogram linkage 68 consists of an upper link 70 and a lower link 72, which each establishes a connection between the carrier 62 and the coulter frame 20 via coupling points 74.

Furthermore, FIG. 4d shows a sowing coulter arrangement 10 that is mounted in a pivotable manner via a swivel axle 76 and by means of a coulter frame 20 on a frame structure, which is not illustrated here. A coulter disk 22 and a pressure roller 48 are mounted on the coulter frame 20. A carrier 62 is mounted in a pivotable manner via a parallelogram linkage 68 on a frame structure of an agricultural machine, which are not illustrated here, with in turn a metering device 32, a seed tube 26, and a catching element 42 being disposed on the carrier 62 such that they form a unit, whereby the arrangement of an outlet 30 of the seed tube 26 in relation to the catching element 42 is at all times kept largely constant. The parallelogram linkage 68 consists of an upper link 70 and a lower link 72, which each establishes a pivotable connection between the carrier 62 and the frame structure via coupling points 74.

Figure 4E:
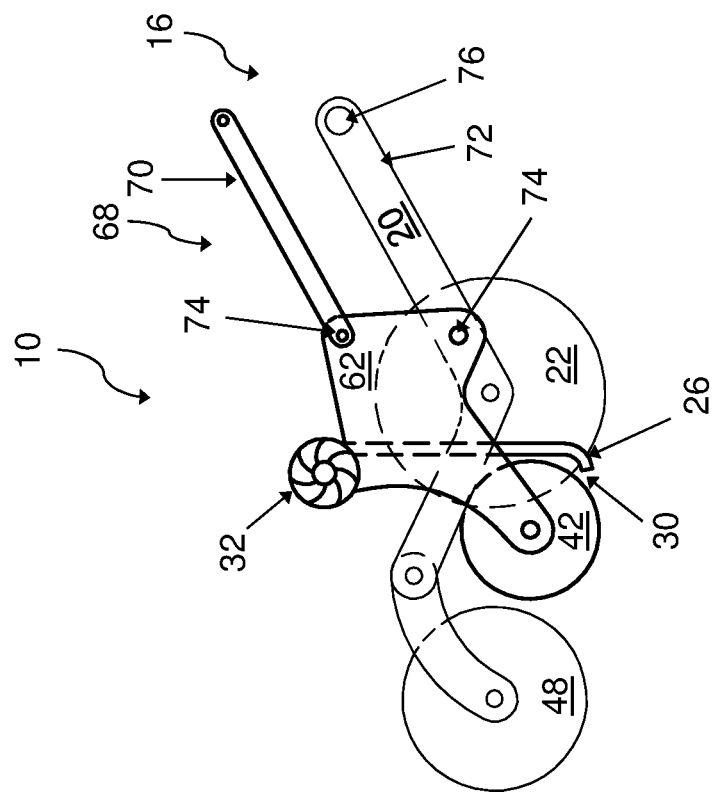
FIG. 4 shows further embodiment variants of sowing coulters in different possible embodiments of carriers and their arrangement in five schematic side views (FIG. 4a to FIG. 4e).

A further embodiment variant is illustrated in FIG. 4e. The suspension device 16 of the sowing coulter arrangement 10 together with the carrier 62 forms a parallelogram linkage 68. Said parallelogram linkage 68 consists of an upper link 70 and a lower link 72, which are each connected to a frame structure via swivel axles 76. The upper link 70 has a coupling point 74, via which the carrier 62 is guided. The coulter frame 20 has a further coupling point 74, via which the carrier 62 is also guided, whereby in turn a parallelogram linkage 68 is formed. That is to say that the sowing coulter arrangement 10 is, on the one hand, connected to the frame structure via a central swivel axle 76. On the other hand, the carrier 62, that is to say the unit of metering device 32, seed tube 26, and catching element 42, is guided via a parallelogram linkage 68, with the result that a depth adjustment of the sowing coulter arrangement 10 has no influence on an angle position of the seed flow in relation to the ground surface. This arrangement, too, is at all times kept largely constant. A coulter disk 22 for creating a seed furrow and a pressure roller 48 for closing the seed furrow are furthermore mounted on the coulter frame 20.

In general, the "sowing coulter arrangement" 10 according to the invention is referred to in the context of the above description of the figures. In some places, the arrangement 10 according to the invention is also referred to "seed drill coulter" or as "sowing coulter" for short. It should be noted here that these terms are generally intended as synonyms and they can be optionally substituted for each other.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

A further alternative embodiment is illustrated schematically in FIG. 5. In the embodiment of FIG. 5, the coulter disk 22 and the carrier 62 are mounted together on a common axis or axle 77. In the embodiment shown, the carrier 62 pivots and the coulter disk 22 rotates about the same axis 77. In addition, a conveyor belt 78 is shown in a tube or housing 80 for receiving the granular material to be distributed from the metering device 32 and directing, conveying or transporting the material downward to the seed furrow.

LIST OF REFERENCE CHARACTERS

10 Sowing coulter arrangement, seed drill coulter arrangement
12 Driving direction
14 Single-disk coulter
16 Suspension device
18 Bearing housing
20 Coulter frame
22 Coulter disk, cutting disk
23 Ground surface
24 Furrow opener
26 Seed tube
28 Inlet
30 Outlet
32 Metering device
34 Spout
36 Curved form
38 Seed flow
40 Circumference
42 Catching element
44 Catching roller
46 Connecting plate
48 Pressure roller
50 Pivot point
52 Spring
54 Latch
56 Depth control roller
58 Adjustment lever
60 Gear teeth
62 Carrier
64 Axle
66 Mounting elements
68 Parallelogram linkage
70 Upper link
72 Lower link
74 Coupling points
76 Swivel axle
77 Common axis
78 Conveyor belt
80 Conveyor belt housing, tube

The invention claimed is:

1. A sowing coulter arrangement of an agricultural machine, the sowing coulter arrangement comprising at least:
   a suspension device for mounting the sowing coulter arrangement on a frame structure;
   a coulter frame, which is connected to the suspension device, for mounting components of the sowing coulter arrangement thereon;
   a coulter disk for creating a seed furrow, the coulter disk being disposed in a rotatable manner on the coulter frame;
   a pressure roller for closing the seed furrow, the pressure roller being pivot-mounted and/or tandem-mounted on the coulter frame and being mounted in a rotatable manner via a pivot point, or furrow-closing implements for closing the seed furrow;
   a metering device for dispensing in an at least largely separated manner a material to be distributed;
   a seed tube for transporting the material to be distributed from the metering device to a seed furrow; and
   a catching element for catching the material to be distributed, with the catching element being disposed downstream of the outlet of the seed tube;
   wherein the metering device, the seed tube, and the catching element form a seeding assembly mounted on a carrier that is pivotably affixed to the coulter frame or to the frame structure, whereby an arrangement of the outlet of the seed tube in relation to the catching element is at all times kept constant.

2. The sowing coulter arrangement as recited in claim 1, with the carrier being pivotably connected to the coulter frame or to the frame structure by means of an axle, or with the carrier being pivotably connected to the coulter frame or to the frame structure by means of a parallelogram linkage.

3. The sowing coulter arrangement as recited in claim 1, with the coulter frame being connected to the frame structure via a swivel axle, and with the carrier being guided via a parallelogram linkage that has a coupling point in the coulter frame and that is connected to the frame structure via an upper link.

4. The sowing coulter arrangement as recited in claim 1, with the carrier being preloaded in relation to the ground surface by means of a spring element.

5. The sowing coulter arrangement as recited in claim 1, with the metering device separating or evenly dispersing the material to be distributed based on the principle of differential pressure or on the principle of centrifugation, or in a mechanical manner.

6. The sowing coulter arrangement as recited in claim 1, with the material to be distributed undergoing an active acceleration in the metering device or in the seed tube.

7. The sowing coulter arrangement as recited in claim 1, with the material to be distributed being conveyed from the metering device to the seed furrow by means of a conveyor belt within the seed tube.

8. The sowing coulter arrangement as recited in claim 1, with a seed flow being generated at the outlet of the seed tube, which seed flow is aligned at least largely tangential to the circumference of the catching element.

9. The sowing coulter arrangement as recited in claim 1, wherein a seed flow is generated at the outlet of the seed tube, with the seed flow forming an angle bisector or a line that is disposed between the ground surface and a tangent to the circumference of the catching element, and wherein the tangent to the circumference encloses an angle in relation to the ground surface, with the angle being less than 75°, in particular less than 60°, preferably less than 45°.

10. The sowing coulter arrangement as recited in claim 1, with a seed flow being generated at the outlet of the seed tube, which seed flow is cut off or interrupted by the catching element.

11. The sowing coulter arrangement as recited in claim 1, with the catching element being made from an elastic material or from a plastic material or a metallic material or a composite material.

12. The sowing coulter arrangement as recited in claim 1, having a depth control roller that is at least in sections disposed next to the coulter disk or behind the catching element or behind the pressure roller.

13. The sowing coulter arrangement as recited in claim 12, with the pressure roller forming the depth control roller.

14. The sowing coulter arrangement as recited in claim 1, with the suspension device being designed as parallelogram linkage.

15. The sowing coulter arrangement as recited in claim 1, wherein the coulter disk comprises a single-disk coulter or a double-disk coulter.

16. The sowing coulter arrangement as recited in claim 1, with the seed tube ending in a furrow opener and with the continuation of the seed tube being formed by the furrow opener.

17. The sowing coulter arrangement as recited in claim 16, with the seeding assembly further including the furrow opener.

18. A sowing assembly of an agricultural machine the sowing assembly comprising:
   a coulter frame connected to a suspension device for mounting the sowing assembly on a frame structure;
   a furrowing tool, for creating a furrow, connected to the coulter frame;
   a metering device for dispensing granular material to be distributed;
   directing means for directing the granular material to be distributed from the metering device to the furrow created by the furrowing tool; and
   a catching element disposed downstream of an outlet of the directing means; wherein
   the metering device, the directing means, and the catching element are mounted on a carrier that is moveably mounted to the coulter frame, whereby the position of an outlet of the directing means relative to the catching element is maintained constant.

19. The sowing assembly as in claim 18 further comprising a furrow closer pivotally mounted on the coulter frame.

20. The sowing assembly as in claim 18 wherein the carrier is pivotably mounted to the coulter frame.

21. The sowing assembly as in claim 18 wherein the carrier is mounted to the coulter frame by a parallelogram linkage.

22. The sowing assembly as in claim 18 wherein the coulter frame is mounted to the frame structure by a parallelogram linkage.

23. The sowing assembly as in claim 18 wherein the outlet of the directing means is aligned relative to the catching element so that granular material discharged through the outlet of the directing means travels approximately tangential to the circumference of the catching element.

24. The sowing assembly as in claim 18 wherein the outlet of the directing means is aligned relative to the catching element so that a path of travel of the granular material discharged through the outlet of the directing means travels at an angle bisector or a line that is disposed between the ground surface and a tangent to the circumference of the catching element, and wherein the tangent to the circumference encloses an angle in relation to the ground surface which is less than 75°, in particular less than 60° and preferably less than 45°.

25. The sowing assembly as in claim 18 wherein the furrowing tool comprises a coulter disk.

26. The sowing assembly as in claim 18 wherein the directing means comprises a tube.

27. The sowing assembly as in claim 18 wherein the directing means comprises a conveyor belt.

* * * * *